Feb. 21, 1950

G. V. LILJESTRÖM 2,498,439

TEN-KEY CALCULATING MACHINE

Filed Sept. 9, 1943

Inventor
Gustaf Vilhelm Liljeström
by Sommers & Young
Attorneys

Feb. 21, 1950     G. V. LILJESTRÖM     2,498,439
TEN-KEY CALCULATING MACHINE
Filed Sept. 9, 1943                                   10 Sheets-Sheet 4

Inventor
Gustaf V. Liljeström
By Sommers & Young
Attorneys

Feb. 21, 1950    G. V. LILJESTRÖM    2,498,439
TEN-KEY CALCULATING MACHINE
Filed Sept. 9, 1943    10 Sheets-Sheet 5

Inventor
Gustaf V Liljeström.
by Sommers-Young
Attorneys

Patented Feb. 21, 1950

2,498,439

UNITED STATES PATENT OFFICE 2,498,439

TEN-KEY CALCULATING MACHINE

Gustaf Vilhelm Liljeström, Goteborg, Sweden

Application September 9, 1943, Serial No. 501,605
In Sweden September 12, 1942

2 Claims. (Cl. 235—79)

The present invention relates to calculating machines for performing calculations according to the four rules.

More particularly, the invention relates to ten-key-set calculating machines having an indexing mechanism movable step-by-step across the machine and rotatable and slidable calculating spindles for transferring the items set up in the indexing mechanism to a totalizer mounted on a calculating carriage.

According to one feature of the invention the calculating spindles are moved longitudinally by the action of spring loaded members which also effect the setting of the numeral wheels of the indexing mechanism, and are rotated by means of a set of proportion racks arranged in superposed relation to each other.

The indexing mechanism also acts as a selector which on the setting of the indexing elements predetermines the setting of the calculating elements of the machine with relation to their driving means in accordance with the keys depressed, whereupon the setting of the calculating elements takes place independently of the keys. The keys have only for their purpose to actuate stops for checking the spring-loaded setting members of the indexing mechanism and to release a stepping device for the indexing mechanism. Thus, the keys only require a very slight touch for their operation which is equal for all of the keys, because all of them are subjected to the same load.

In the accompanying drawings an example of a calculating machine embodying this invention is illustrated.

Fig. 9 is a front view, partly in section.

For the sake of better understanding I will hereinafter describe the various main parts of the machine individually and explain their operation in connection therewith. The main parts of the machine are a key board, an indexing mechanism or selector controlled by the keys of said key-board, a group of counting spindles the setting of which preparatory to the performance of a counting operation is determined by the indexing mechanism, a set of toothed racks, hereinafter referred to as proportion racks, for operating the counting spindles in conformity with the setting thereof, a manually operated or power-driven main shaft for actuating the proportion racks, and a carriage movable crosswise of the machine for supporting the totalizer and the quotient register. Of these main parts, the said carriage, the totalizer and the quotient register are only indicated, i. e. not illustrated in detail, since they do not constitute subject matter of the invention but may be of conventional type.

The main parts above stated are all mounted in a rigid frame, comprising a base plate 1, two side members, hereinafter referred to as left hand and right hand side members and designated by the numerals 2 and 3, respectively, and a plurality of plates or stays arranged across the frame to interconnect the side members thereof. At the front of the frame the key board of the machine is constituted by an upper plate 4, a lower plate 5 situated slightly above the base plate 1 of the frame and a rear plate 6 extending from the rear edge of the lower plate 5 up to about half the height of the key board and slightly inclined rearwardly. Inserted between the upper and lower plates 4, 5 of the key board is a set of vertical plates 7 extending parallel to the side members of the frame which form partitions of the key board frame and supports for the movable elements of the key board. The transverse stays comprise, substantially, rear upper and front lower bars 8 and 9, respectively, for supporting the totalizer carriage, and a bar 10 for supporting the indexing mechanism.

Figure 2:
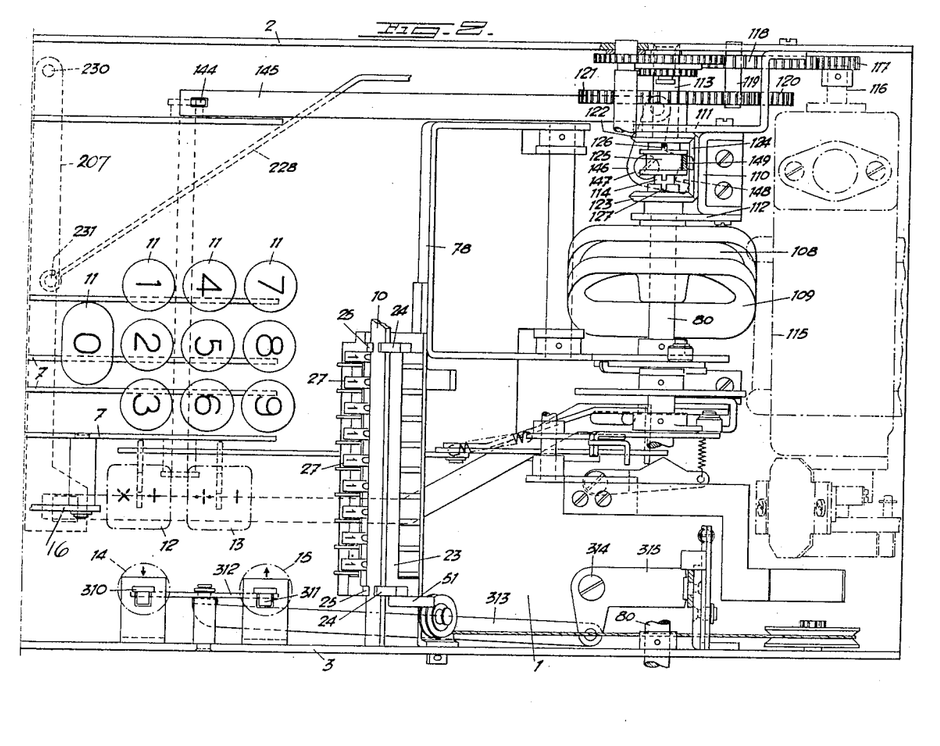
Fig. 2 is a plan view of the machine with parts shown in section and other parts broken away.

The key board, Fig. 2, includes ten numeral keys 11, marked with the digits 0 to 9, for instance in the way indicated in the drawing, two keys 12 and 13 by means of which the machine can be set for addition and multiplication or subtraction and division, respectively, two tabulator keys 14, 15 for effecting the stepping of the totalizer carriage to the right and left, respectively, and, finally, a shift arm 16 settable in the performance of a multiplication or a division, to permit repeated operations by preventing the restoring of the indexing mechanism and the counting spindles to their starting positions.

Figures 1, 1A:
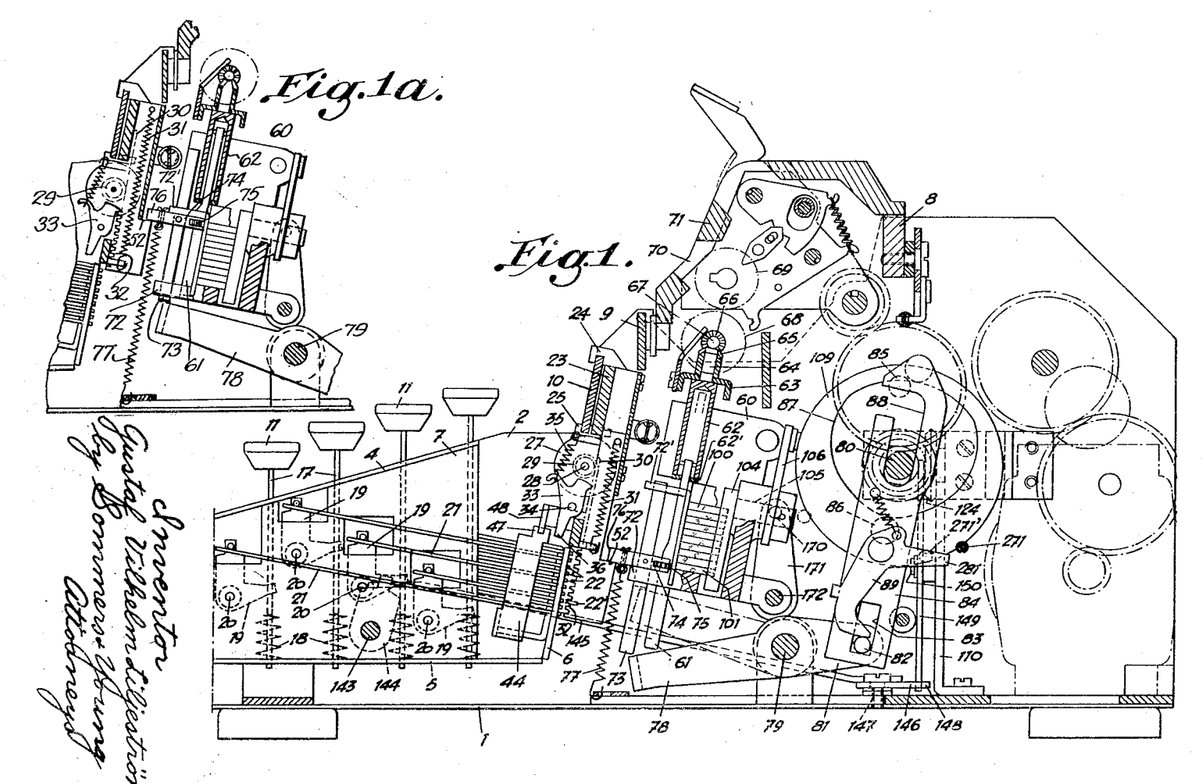
Fig. 1 is a section of the machine along a vertical plane parallel to the side walls of the machine frame, that is, a vertical longitudinal section.
Fig. 1a is a view similar to Fig. 1 of part of the mechanism with some of the parts in different positions of operation.
Figure 9:
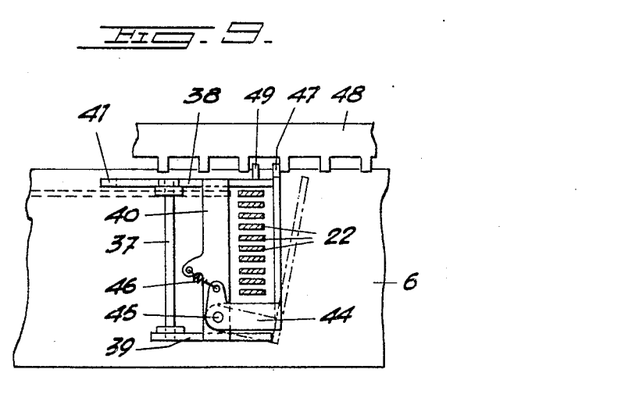

The numeral keys 11, Fig. 1, are supported by vertical rods 17 slidably mounted in the upper and lower plates 4 and 5 of the key board frame. Springs 18 normally keep the keys in their raised position, as shown in Fig. 1. Associated with each numeral key is a bell crank lever 19 mounted on a pin 20 fastened to an appropriate one of the partitions 7. Each bell crank lever 19 comprises an approximately horizontal arm engaging a slot in the supporting rod 17 of the respective key and an approximately vertical arm, engaging a longitudinal extending bar 21. The bars 21 are arranged so as to slope slightly downward rearwardly and are guided in apertures formed in the rear wall 6 of the key board frame. Said apertures are situated above each other, the bars being correspondingly bent to allow said arrangement; thus the rear ends of bars 21 projecting beyond the wall 6 form a vertical row, as shown at 22 in Figs. 1 and 9.

Normally, the ends 22 of the bars 21 only project slightly beyond the wall 6. On depression of a key 11 the corresponding bell crank lever 19 is swung in clockwise direction, as viewed from the right hand side of the machine, thereby displacing the associated bar 21 rearward, causing its rear end 22 to project further beyond the wall 6. In this position the projecting end of the bar acts as a stop for a setting element of the indexing mechanism.

The said displacement of the bar 21 may also be utilized in releasing the setting element and controlling the feeding of the indexing mechanism one step to the left. These functions will be more fully explained in connection with the description of the indexing mechanism.

The indexing mechanism is mounted in a frame 23 slidable on the smooth bar represented by the cross stay 10 by means of upper and lower slide shoes 24, 25, respectively, see Figs. 1 and 2. A strong coil spring 26, Fig. 19, tends to displace the indexing mechanism to the left. The indexing mechanism includes a plurality, in the example shown nine, numeral wheels 27, Figs. 1, 2 and 19, visible through a window in the cover of the frame (not shown). Said numeral wheels are rotatably mounted on a shaft 28 extending across the frame 23. Rigidly attached to each numeral wheel is a toothed wheel 29 in mesh with a vertically movable rack 30 individual thereto. Traction springs 31 secured at their upper ends to the respective racks and at their lower ends to the frame 23 tend to displace the racks downwardly and rotate the respective numeral wheel correspondingly. Formed in the rack below the teeth thereof is a set of rectangular teeth and notches 32 for locking the rack subsequent to its displacement. For each rack 30 a pawl 33 is provided mounted on a shaft 34 which engages the rack 30 to maintain it in its uppermost, or normal, position. Said pawls are held in said engagement by means of springs 35. The release of a pawl is effected by means of a releasing mechanism controlled by the bars 21 which acts upon depending arms 36 of the pawls to release same when the setting of the respective numeral wheel is to take place.

The means for releasing the pawls 33 is combined with a feeding mechanism for stepping the indexing mechanism. This combination is shown in detail in Figs. 9 and 10.

Figure 10:
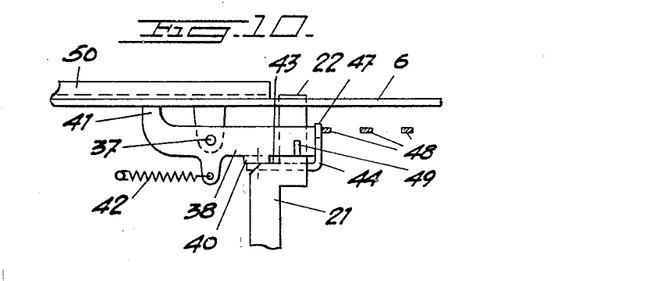
Fig. 10 is a plan view of the stepping device for the indexing mechanism.

Rigidly mounted at the front surface of the rear wall 6 of the key board is a vertical shaft 37. Pivoted to this shaft is an I-shaped body comprising an upper horizontal member 38, a lower horizontal member 39 and a vertical bridge-member 40 interconnecting the members 38 and 39. The upper member 38 is extended on the opposite side (to the left) of shaft 37 and forms there a finger 41 abutting against the wall 6 under the action of a spring 42. Each individual bar 21 is formed with a shoulder 43 bearing against the bridge member 40, as shown in Fig. 10.

Pivoted to the lower portion of the bridge member 40 at 45 is a lever 44. Said lever includes a horizontal member extending from the pivot pin 45 below the row of ends 22 of bars 21 and a vertical member extending along the right hand side of said row of bar ends 22. A spring 46, Fig. 9, acts on the lever 44 to hold it in a position in which the vertical member thereof abuts against the right hand end of the upper member 38 of the I-shaped body 39—40. In this position a projection 47 on the upper end of the vertical member of lever 44 projects above the level of said member 38 into the path of teeth formed on the lower edge of a bar 48 rigidly attached to the frame of the indexing mechanism. The upper member 38 of the body 39—40 is provided with a similar projection 49 on its upper surface, said last mentioned projection being positioned to the left of the projection 47 a distance corresponding to half a pitch of the rack 48 and being further displaced forwardly with relation to the projection 47 as will clearly appear from Fig. 10.

The mechanisms above described operate as follows:

On depression of a key 11 the corresponding bar 21, as already stated, is displaced rearwardly, causing its rear end 22 to project to such an extent beyond the wall 6 (as indicated at 22' in Fig. 1) as to allow it to act as a stop for a downwardly moving rack 30 of the indexing mechanism. The bar 21 thus displaced actuates by means of its abutment 43 the bridge member 40 of the body 38—40, causing the latter to turn on its shaft 37, until the projection 47 reaches a position behind the rack 48 out of the path of its teeth. At the same time, however, the projection 49 enters the path of said teeth. As a result, the indexing mechanism or selector is allowed to move to the left under the influence of the spring 26 until the tooth of the rack 48 previously in engagement with the projection 47 is stopped by the projection 49, that is to say, after the rack has moved about half a pitch or step to the left. During the turning of the body 38—40 just described, the projection 47 actuates the depending arm 36 of the pawl 33 in front thereof, causing it to release the corresponding rack 30 which will now descend under the action of spring 31 until stopped by the projecting end 22 of a bar 21. By said movement of a rack 30, the associated numeral wheel 27 is rotated a number of steps corresponding to the movement of the rack, into a position, in which it shows the digit set up. As the key is released it is restored to its normal position by its spring 18, the corresponding bell crank lever 19 and associated bar 21 being at the same time returned to their normal positions. As the bar 21 is restored, the body 38—40 is swung back by the action of the spring 42 until its finger 41 is stopped by the wall 6. During this operation the projection 49 is moved out of the path of the teeth of rack 48 while the projection 47 is moved thereinto. The indexing mechanism is thus displaced to the left the remaining portion of the pitch, that is, the succeeding tooth of rack 48 is caught by the projection 47. At the commencement of this displacement the slot 32 which is at that time on a level with a bar 50 rigidly attached to the wall 6, Fig. 10, will allow the rack 30 to slide in on said bar. By this means the rack 30 is locked in its set position as long as it is situated to the left of the row of projecting bar ends 22.

To enable a manual restoring of the indexing mechanism, as is common in performing multiplications or divisions, a handle 51, Fig. 2, is provided at the right hand side of the frame of the indexing mechanism.

The racks 30 of the indexing mechanism are each formed with a shoulder 52 on their rear edge, said shoulder representing a stop to determine the setting of those counting elements by means of which the items set up are transmitted to the totalizer. Said counting elements comprise rotatable and slidable counting spindles arranged in a vertical or inclined position behind the extreme left hand position of the indexing mechanism. The counting spindles extend parallel with the racks 30 of the indexing mechanism and correspond to the same in number and mutual distance. Each counting spindle includes a lower rod-shaped member 61, Fig. 1, slidably and rotatably mounted in a rigid frame, and an upper sleeve-shaped member 62 slidably but not rotatably connected to the lower member. The sleeve-shaped members of the various spindles are rotatably mounted by means of upstanding studs 64 in a common beam 63 extending transversely above the sleeves. Each stud carries a mitre wheel 65 meshing with a mitre wheel 66 journalled on a transversely extending shaft 67 rigidly secured to the beam 63. Rigidly attached to each mitre wheel 66 is a spur wheel 68 adapted to mesh with a spur wheel 69 connected to the numeral wheels of the totalizer which are visible through a window 70 provided in the totalizer carriage 71 reciprocable along the bars 8 and 9.

The lower members 61 of the counting spindles are rotatably and slidably mounted in cylindrical borings of a lower arm 72 and an upper arm 72' of frame 60. At their upper ends the spindles 61 are flattened on diametrically opposite sides and brought into engagement with correspondingly elongated apertures in the bottom 62' of the sleeves 62. The lower member 61 of each counting spindle is carried by a parallel guide rod 73 slidably mounted in the frame 60. Each guide rod carries its corresponding spindle member 61 by means of a fork-shaped lower arm 74, embracing a toothed wheel 75 rigidly mounted on the spindle member 61. The end of the arm 74 remote from the toothed wheel 75 which is designated by the reference numeral 76 is adapted to check the setting movement of the associated spindle by engaging the shoulder 52 of a rack 30 situated right in front of the spindle, as the guide rod and the spindle after the guide rod has been released by withdrawing a stop member therefor descend under the action of a spring 77 attached to the end 76 of arm 74. Thus, the counting spindle is moved to a position determined by the downward movement of the rack 30 which movement in its turn is determined by the depression of a numeral key. It is thus seen that the counting spindle has been set to a position determined by the key depressed.

Figure 8:
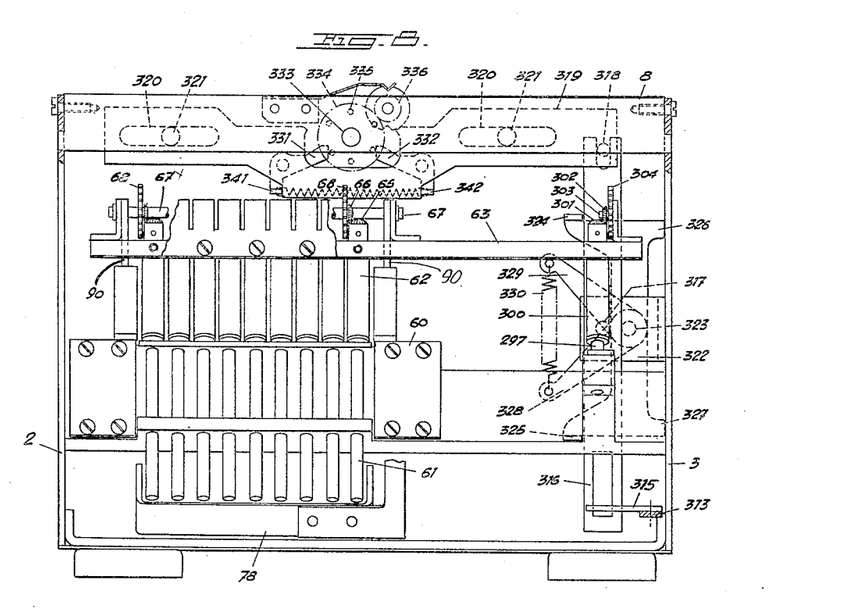
Fig. 8 is a front view of the calculating spindles and associated elements.

The above said stop member comprises a bridge 78 adapted to cooperate with all of the guide rods, Figs. 1 and 8, which is mounted to turn about a transversely extending shaft 79 carried by posts secured to the base plate of the machine frame. Normally said bridge holds the guide rods in raised position, as indicated by dotted lines in Fig. 1. The bridge is actuated from the main shaft 80 by the following means.

The bridge 78 is provided with a rearwardly projecting arm 81 having a laterally projecting pin 82 near its end. Said pin engages an elongated slot 83 of a plate 84, radially arranged with respect to the shaft 80, which carries a pair of rolls 85, 86 for cooperation with a cam 87 on the main shaft, whereby a reciprocating movement is imparted to the plate 84 on the rotation of the main shaft. In this reciprocating movement the plate 84 is guided by the main shaft by means of a slot 88 through which the main shaft extends. Mounted on the plate 84 is a pawl 89 normally maintaining the pin 82 in engagement with the lower end of the slot 83, thereby causing the bridge 78 to oscillate upon the rotation of the main shaft.

The vertically movable beam 63 in which the sleeves 62 of the counting spindles are mounted, is carried by two slides 90 (Figs. 3 and 8) movable up and down in the frame 60. By means of pins 91, Fig. 3, the slides 90 are suspended in the forked ends of arms 92 secured to the ends of a transversely extending shaft 93 rotatably mounted in the frame 60. Each of said arms is formed integrally with an upwardly projecting arm 94. The two arms 94 are connected together by means of a cross stay 95 adapted upon the rotation of shaft 93 to actuate pawls 96 cooperating with the numeral wheels 69 of the totalizer for braking purposes. The arm 92 attached to the right hand end of shaft 93 is also formed integrally with a depending arm 97 carrying a roller 98 in engagement with a cam 99 on the main shaft 80 in order to impart an oscillation to the shaft 93 upon rotation of the main shaft.

The toothed wheels 75 on the counting spindles are adapted to impart to the spindle a rotary movement the amount of which is determined by the vertical adjustment of the spindles. Said transfer of movement is effected from a series of transversely extending racks 100 placed above each other behind the group of counting spindles.

Figure 5:
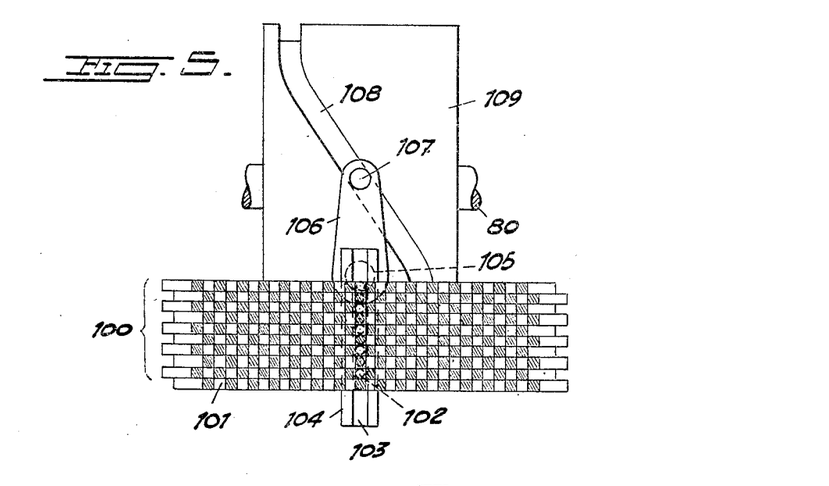
Figs. 5–7 are diagrammatic front views of the racks for rotating the calculating spindles, Fig. 5 showing their normal position, Fig. 6 their extreme right hand position, and Fig. 7 their extreme left hand position.
Figure 6:
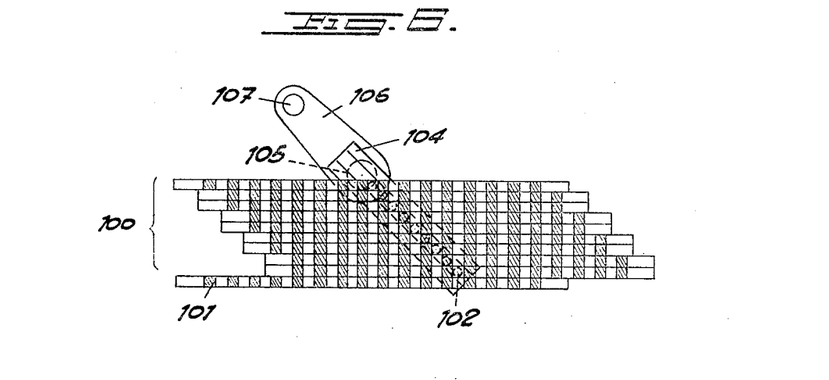
Figure 7:
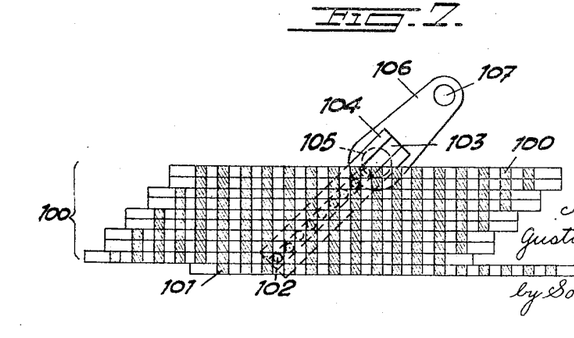

The transversely reciprocable racks 100 are nine in number in the example shown. The lowermost one rests on a rack 101 rigidly arranged in the machine frame, cfr. Figs. 5–7. Each reciprocable rack carries on its rear edge a pin 102 situated in the middle of the rack. All of the pins 102 engage a guiding groove 103 formed in a bar 104 pivoted to the fram 60 by a stud 105 the centre of which is on a level slightly above that of the uppermost rack 100. Attached to the other end of the pivot stud 105 is an upwardly projecting arm 106 carrying a pin 107 in engagement with a cam slot 108 formed in the cylindrical circumference of a drum 109 on the main shaft 80. Thus, by the rotation of the main shaft the arm 106 and the bar 104 are caused to oscillate about the axis of the stud 105, thereby imparting a reciprocation to the racks 100, the amount of which is different for each individual rack. The rack 101, of course, has no connection with the bar 104.

Fig. 5 shows the position of the racks, which may be termed "proportion racks," with respect to each other in the full cycle position of the machine. In this position the guide bar 104 is vertical. The teeth of every second rack are now situated right above, or below, the spaces of the adjacent lower and upper racks. The toothed wheels 75 of the counting spindles are in mesh with the uppermost rack 100 inasmuch as they are held in raised position by the bridge 78 and cannot move down. On rotation of the main shaft one revolution the guide bar 104 is caused to swing, according to the direction of rotation, first to the one and then to the other extreme positon, shown in Figs. 6 and 7, to be then restored to the normal position shown in Fig. 5. In said extreme positions the tooth spaces of the racks 100 are all situated above the tooth spaces of the stationary rack 101. The bridge 78 while descending allows the toothed wheels 75 and the counting spindles to descend until the projections 76 are caught by the shoulders 52 of the oppositely positioned racks 30 of the indexing mechanism or selector.

Figures 22, 23:
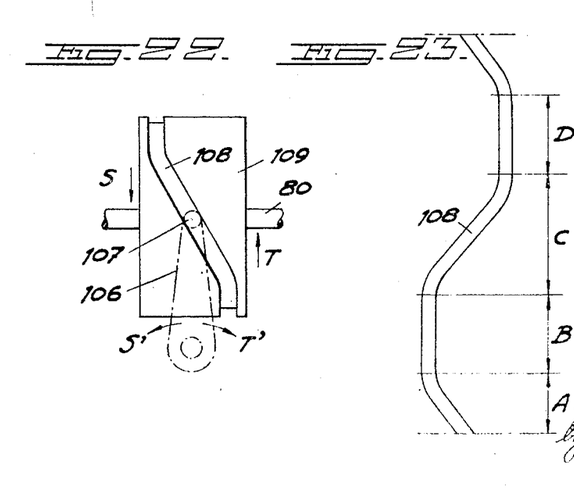
Fig. 22 shows a cam slot disc for operating the racks controlling the rotation of the calculating spindles.
Fig. 23 shows the cam slot developed.

The cam slot 108 controlling the movement of the guide bar 104 includes for each of the extreme positions a straight portion B or D of comparatively large angular extension, as indicated in Fig. 23. The guide bar 104 is thus held stationary in its extreme positions for a sufficiently long time to allow the spindles to descend or be raised, as the case may be.

On the displacement of the racks from their normal position shown in Fig. 5 to one extreme position, as for instance to that shown in Fig. 6, the uppermost one of the racks 100 is displaced half a pitch to the right, the rack next following a whole pitch and so on, and the lowermost rack 4½ pitches. In the position shown in Fig. 6 the lower members 61 of the counting spindles are forced downwards by their spring 77 to the positions determined by the shoulders 52 of the selector racks 30 set. During the subsequent swinging movement of the guide bar 104 from the position shown in Fig. 6 to the position shown in Fig. 7 under the control of the portion C of the cam slot 108 (Fig. 23), the uppermost rack 100 will be displaced to the left a distance corresponding to an entire pitch, the next, or second, rack a distance corresponding to 2 pitches, the third rack a distance corresponding to 3 pitches and so on, so that the lowermost rack 100 will be displaced a distance corresponding to 9 pitches to the left. The toothed wheels 75 in mesh with the various racks 100 impart when thus displaced a corresponding rotation of the respective counting spindles. In the other extreme position the lower members 61 of the counting spindles are raised by the bridge 78 so as to again engage the uppermost rack 100.

The main shaft 80 from which the movements of the proportion racks 100 and the bridge 78 are derived is mounted, in part, in the right hand side member 3 of the machine frame and, in part, in a separate bearing post comprising an upright 110 and two side members 111 and 112, Fig. 2. The side member 111 is also secured to the left hand member 2 of the frame. Provided in the side member 112 is a bearing for the left hand end of the main shaft. Mounted in the side member 111 and the left hand side member 2 of the machine frame is a horizontal shaft 113 situated on a line with the main shaft. A thin end piece 114 of the main shaft extends to the shaft 113 and preferably into a through extending boring thereof.

To permit manual driving, the main shaft carries outside the right hand side member 3 of the machine frame a handle not shown in the drawing. The motor drive for the main shaft is constructed as follows.

Provided in the rear portion of the machine frame is an electric driving motor 115 indicated by dotted lines in Fig. 2 which is screwed to the base plate 1 of the frame. The motor shaft 116 carries a pinion 117 in constant mesh with a toothed wheel 118 rotatably mounted on a shaft 119 attached to the left hand side member 2 of the frame. Rotatably mounted on said shaft 119 is another toothed wheel 120 which may be coupled to and uncoupled from the toothed wheel 118 by means of a clutch illustrated in Fig. 3. The toothed wheel 120 is in constant mesh with a toothed wheel 121 on shaft 113.

On its end facing the main shaft, at the inside of the side member 111 of the bearing post 110—112, the shaft 113 carries a bevel wheel 122. Loosely mounted on the opposite end of the main shaft, at the inside of the side member 12 of said bearing post, is a similar bevel wheel 123. The two bevel wheels 122 and 123 are both in mesh with an intermediate bevel wheel 124 mounted in the upright 110. Slidably but not rotatably mounted on the extension 114 of the main shaft located between the bevel wheels 122 and 123 is a clutch sleeve 125 having claws at both ends adapted to engage recesses 126, 127 formed in the hubs of the bevel wheels 122 and 123. By means of this clutch the main shaft 80 may be coupled either directly to the shaft 113 or to the bevel wheel 123 so as to effect either a non-reversed or a reversed transfer of movement between the shafts 113 and 80.

The operation of the clutch sleeve 125 is controlled by means of the keys 12 and 13. Said keys are carried by vertical rods 129 and 130, respectively, which are slidably mounted in the upper and lower walls 4 and 5, respectively, of the key board frame, see Fig. 4. Rod 129 rests by means of an abutment 131 on the upper edge of a lever 133 which is mounted to rotate on a transversely extending stud 135. Rod 130 rests similarly by means of an abutment 132 on the upper edge of a lever 134 mounted on a transversely extending stud 136. Said levers 133, 134 are acted on by springs 137 and 138, respectively, which normally maintain the levers and thus also the keys 12, 13 in raised position. The free ends of the levers 133, 134 are oppositely directed and overlap each other as shown. The lower edges of the levers 133, 134 are shaped as curves 139 and 140, respectively, adapted to engage a pin 141 on an arm 142 which is keyed to the right hand end of a shaft 143 extending across the key board frame near the bottom 5 thereof. Said curves 139 and 140 are so designed as to cause the lever 133 when moving down as a result of the depression of key 12 to move the pin 141 from the position shown in full lines in Fig. 4 to the position indicated by the dotted circle 141', whereas the lever 134 in its downward movement as a result of a depression of key 13 returns the pin 141 from the position 141' to the position shown in full lines. By this means the shaft 143 is rotated in counter-clockwise direction as seen from the right hand side of the machine on the depression of key 12 and an equal angle in clockwise direction on the depression of key 13.

To the left hand end of shaft 143 is attached an arm 144, Figs. 1 and 2. A link 145 connects this arm with one end of a bell crank lever 146 mounted on the base plate 1 by means of a pivot 147 situated nearly vertically below the main shaft 80. The other end of said bell crank lever is shaped as a fork 148, Fig. 2, embracing the lower end of a vertical control bar 149 for the clutch sleeve 125. Said control bar is mounted in the bearing post 110 at 150, Fig. 1. By the mechanism above described the clutch sleeve 125 is brought to engage the bevel wheel 123 on the main shaft 80 on the depression of key 12 and is caused to engage the bevel wheel 122 on shaft 113 on the depression of key 13. In the former case the main shaft is coupled for rotation in the direction required for multiplication and addition and in the latter case for rotation in the direction required for division and subtraction.

The keys 12 and 13 not only effect reversal of the main shaft but also function as starting keys for the motor drive. To this end each of the abutments 131 and 132 of the key rods 129 and 130 actuate not only the levers 133 and 134 but also bell crank levers 151 and 152, respectively. The former is mounted on the same stud 135 as the lever 133, the latter, on the contrary, being mounted on a separate stud 153. Bell crank lever 151 comprises an approximately horizontal arm projecting into the path of the respective abutment 131, the upper edge of which is situated at a certain distance below the upper edge of the corresponding lever 133, and an approximately vertically depending arm journalled at 154 to link 156. Bell crank lever 152 similarly comprises a horizontal arm projecting into the path of abutment 132, the upper edge of which is situated at a certain distance below the upper edge of lever 134, and a vertically depending arm journalled at 155 to link 156. Said link which is common to both of the bell crank levers is acted on exactly in the same way by both of them, inasmuch as on depression of either key 12 or 13 it will be displaced forwardly, that is to say towards the key board a little distance after the rotation of shaft 143 and thus the coupling of the main shaft for the desired direction of rotation has been completed. Said displacement of link 156 is utilized on the one hand for coupling together the toothed wheels 118 and 120 rotatably mounted on the shaft 119 in order to enable power transmission from the motor shaft to shaft 113 and on the other hand for closing the circuit of the driving motor. To this end the following means are provided.

Figure 3:
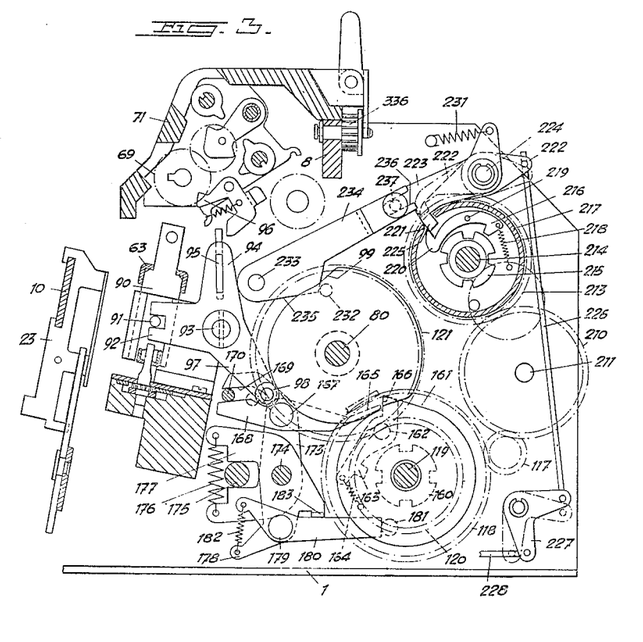
Fig. 3 is a vertical longitudinal section of the rear part of the machine to show certain details of the driving mechanism of the machine.

The above said clutch inserted between the toothed wheels 118 and 120 rotatably mounted on shaft 119 comprises a toothed disk 160 rigidly connected to one toothed wheel, as for instance, wheel 118, Fig. 3, and a pawl 163 mounted to turn on a pivot pin 162 which may be either directly attached to the other toothed wheel 120 or to a disk 161 rigidly connected thereto. Pawl 163 is acted on by a spring 164 tending to bring the pawl into operation. The release of the pawl is effected by means of a releasing arm 165 engaging a projection 166 of the pawl. The releasing arm is mounted on a stud 167 and carries on the opposite side thereof, that is to say in front of said stud, a fork-shaped projection 168 the slot 169 of which is engaged by a pin 170 attached to the end of an arm 171, Fig. 1, fixed to a shaft 172 extending across the frame 60 and rotatably mounted therein. The stud 167 carrying the releasing arm 165 is carried by a lever 173, Fig. 3, pivoted at 174 to the left hand member of the machine frame. The lever 173 carries below the pivot 174 a forwardly projecting arm urged upwardly against a pin 175 under the influence of a strong spring 176. The other, that is to say upper, end of said spring forces a forwardly projecting arm of another lever 177 mounted on the stud 174 downwardly against the same pin 175. The lever 177 is provided with a depending arm 178 on which a stop arm 180 is mounted at 179, the free, i. e. rear, end of which is normally situated in the path of a pin 181 on the disk 161 carrying the clutch pawl 162. A spring 182 tends to maintain the stop arm 180 in this position by forcing it from below against a lateral projection 183 of the lever 177.

Figures 4, 15:
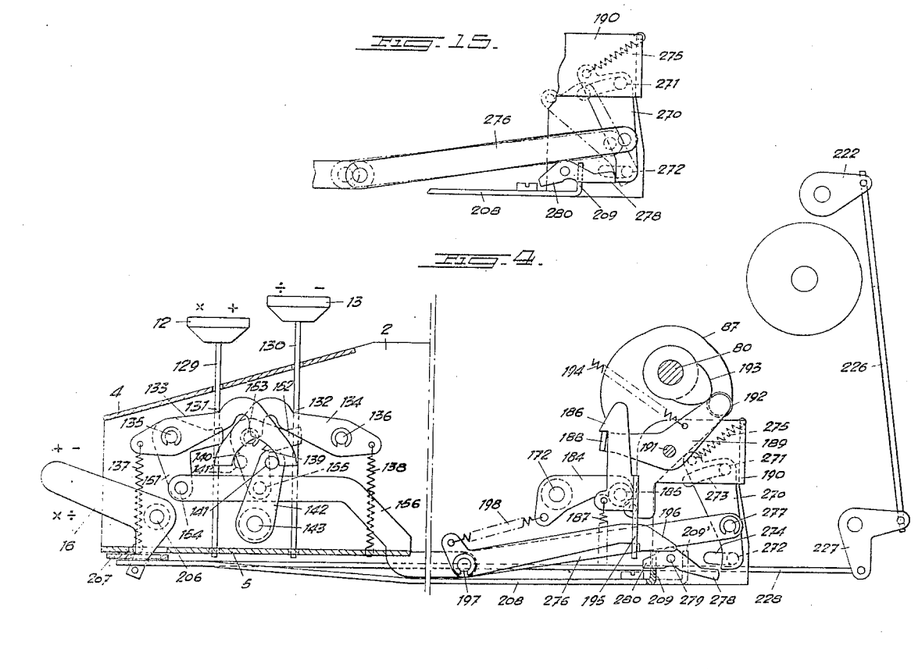
Fig. 4 is a side elevation, partly in section, of the starting and operation controlling mechanism of the machine.
Fig. 15 is a side elevation of other details of said mechanism.

Shaft 172 which adjacent the left hand side member of the frame carries the arm 171 has keyed thereto in the right hand part of the machine an arm 184, see Fig. 4. Rotatably mounted on a stud 185 secured to this arm is an upwardly directed pawl 186 acted on by a spring 187. Said pawl normally engages the upper edge of a lateral projection 188 provided at one end of a bell crank lever 189 pivoted at 191 to a stationary portion 190 of the frame. At its other end said lever 189 carries a roller 192 bearing against the circumference of a cam 193 on the main shaft 80 under the action of a spring 194.

The pawl 186 is provided with an arm 195 depending below the stud 185. Extending through an aperture in this arm is a catch lever 196 pivoted at 197 to the rear end of link 156. The forward displacement of said link 156 above referred to as a result of the depression of either of the keys 12, 13 moves the catch lever 196 forwardly. The catch lever when thus moved forwardly brings the arm 195 with it, thereby swinging the pawl 186 out of engagement with the projection 188. The catch lever 196 is maintained in engagement with the lower edge of the aperture in the arm 195 by the action of a spring 198. After having released the projection 188 the pawl 186 is allowed to descend by the action of its spring 187. Since the pawl 186 is mounted on the arm 184 it will take the latter with it, thereby turning the shaft 172 in clockwise direction as viewed from the right hand side of the machine (Fig. 4). The turning of shaft 172 swings the arm 171 backwardly (i. e. to the right in Fig. 1) so that the pin 170 thereon goes further into the slot 169 of fork 168, Fig. 3, thereby depressing the fork and raising the releasing arm 165. The releasing arm is now brought out of engagement with abutment 166 of the clutch dog 163, allowing the spring 164 to bring same into engagement with the clutch disc 160, thereby coupling together the toothed wheels 118 and 120 and bringing the shaft 113 and thus also the main shaft into operative connection with the motor shaft to be driven thereby, as soon as the circuit of the motor is closed.

Figure 11:
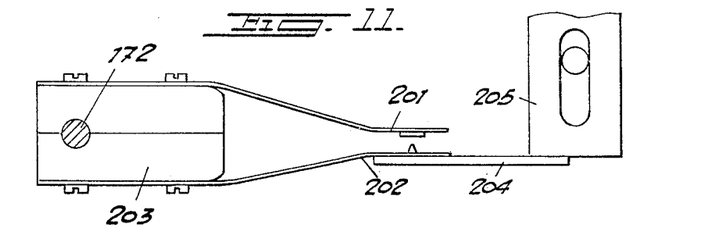
Figs. 11 and 12 are side elevations of an interrupter for the electric driving motor of the machine, Fig. 11 showing the open state and Fig. 12 the closed state thereof.
Figure 12:
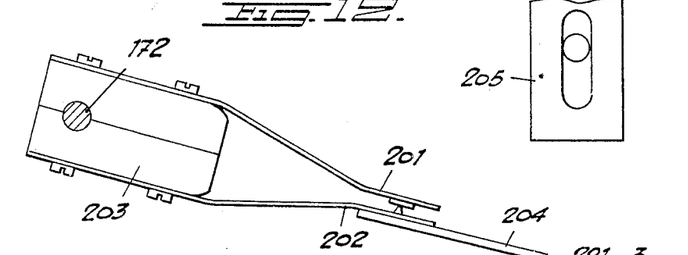

The opening, as well as the closing, of the circuit of the motor is also effected under the control of the starting keys. To this end an interrupter for the motor circuit is provided on the shaft 172 from which shaft the actuation of the releasing arm 165 for the clutch pawl 163 is derived, as just described. Said interrupter consists of a pair of contact springs 201 and 202 fastened to said shaft 172 by means of a pair of insulating blocks 203 as shown in Figs. 11 and 12. Normally, the contact springs extend in an approximately horizontal position, with spring 201 situated above spring 202. Spring 202 carries a projecting arm 204 of insulating material which in the normal position of the machine abuts against a stop 205 in such a way as to hold spring 202 out of contact with spring 201, as shown in Fig. 11. As the shaft 172 on the depression of either of the starting keys 12 or 13 is turned in a clockwise direction in the manner already described, the arm 204 is brought out of engagement with the stop 205, as shown in Fig. 12, thereby allowing the contact springs to meet and close the circuit.

The operations above described as resulting from depression of either of the keys 12 and 13 take place in the following order: Firstly, the clutch sleeve 125 is actuated so as to effect coupling of the main shaft for the desired direction of rotation, that is to say, positive for multiplication and addition by depression of the starting key 12 and negative for division and subtraction by depression of the starting key 13; secondly, the clutch 160—163 is operated and, thirdly, the circuit of the motor is closed. If the clutch sleeve 125 has previously been set to the position desired, due to the fact that the starting key to be used has already been used in the starting of the machine next preceding, nothing will happen during the first portion of the depression of the key, that is to say, while the abutment 131 or 132 actuates the respective lever 133 or 134 and before it reaches the associated bell crank lever 151 or 152. If, for instance, the key 13 has been used in the starting of the machine next preceding, then the arm 142 will already be in the position shown in Fig. 4 and, consequently, the descension of the lever 134 will have no effect.

In performing an addition or subtraction the main shaft should only make one revolution after each depression of key 12 or 13; in performing a multiplication or division, on the contrary, the main shaft has to rotate continuously as long as the key 12 or 13 is held depressed. Thus either key has to control in the one case a single revolution and in the other case a continuous rotation. To permit this effect the shift arm 16 is provided.

The shift lever is loosely mounted on a transversely extending stud 206 fastened to the key board frame. It consists of a bell crank lever having a depending arm which extends freely through a slot in the lower wall 5 of the key board and a slot in an arm 207 extending across the frame which is situated below said wall 5 and engages below said arm a longitudinally extending link 208. The arm 207 will be described later. The link 208 extends nearly to below the main shaft 80. The rear end 209 of the link is curved upwardly so as to form a stop below the catch lever 196. The link may be guided longitudinally by means of a pin fastened to the base plate of the frame which engages a slot in the link.

Figures 13, 14:
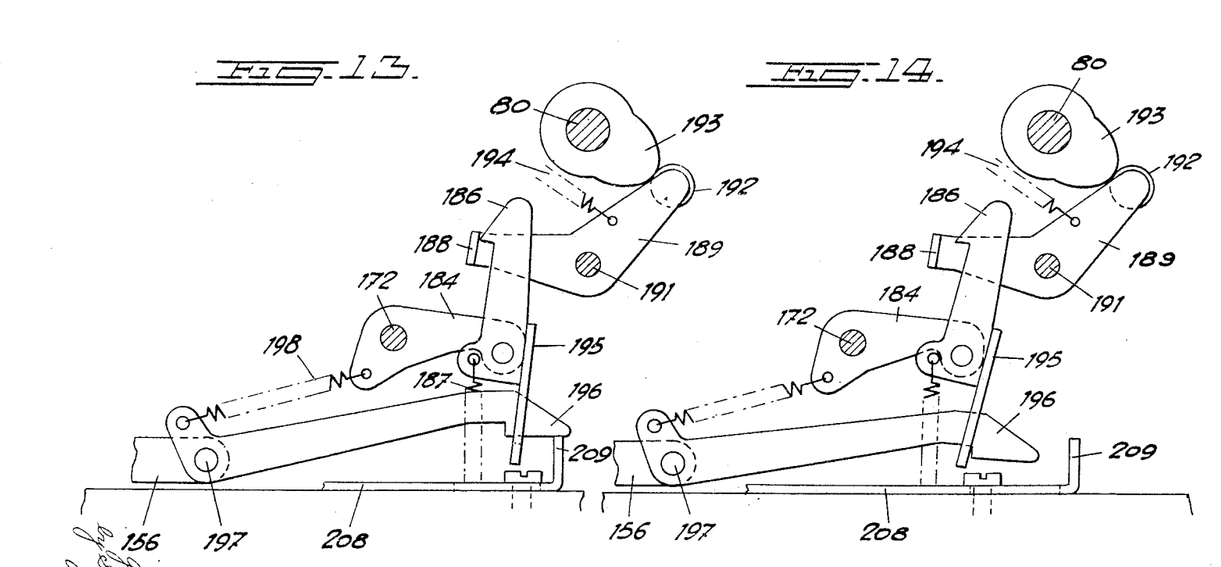
Figs. 13 and 14 are side elevations of certain details of the operation controlling mechanism as seen in two different positions.

The shift lever may be set into two positions: an upper position for addition and subtraction, designated by + − in Fig. 4, and a lower position for multiplication and division, designated by × and ÷ respectively in Fig. 4. In the said first mentioned position, which is that shown in Fig. 4, the stop 209 is situated below the catch lever 196. During the depression of either key 12 or key 13 and the resulting release by the catch lever 196 of the pawl 186 from its engagement with projection 188 of lever 189 as already described so as to allow the spring 187 to turn the lever 184 and thus also the shaft 172 in clockwise direction to its starting position, the catch lever 196 remains resting on the stop 209, as shown in Fig. 13, which figure illustrates the end position after the movements just described have been completed. Due to the fact that the catch lever 196 is held in raised position by the stop 209 it is prevented from accompanying the arm 195 as the latter is forced downwards together with the lever 184 by the action of the spring 187. As a result, the engagement between the catch lever 196 and the lower edge of the slot in the arm 195 now ceases, and it is thus impossible for the catch lever 196 to prevent the pawl 186 from being caught by the projection 188 and raised back again to its starting position, shown in Fig. 4, thus locking shaft 172 in its stop position as soon as the lever 189 is operated by cam 193 after a complete revolution of the main shaft. It is now impossible to again start the machine before the key 12 or 13 depressed has been released, so as to allow the catch lever 196 to return to the position shown in Fig. 4 under the influence of the spring 198.

When the shift lever 16 is in its lower (multiplication and division) position, the link is in its extreme rear position in which the stop member 209 is in a position behind the catch lever 196 as shown by dotted lines at 209′ in Fig. 4. On depression of either key 12 or key 13 and resulting forward displacement of the catch lever 196 the latter brings the arm 195 with it just as before, but since it is not resting on the stop 209 now, it will maintain its engagement with the lower edge of the slot in the arm 195 and continue to move downwards together with the arm 195. The final position now obtained is that shown in Fig. 14. In this position the pawl 186 is held swung out of the path described by the projection 188, as the lever 189 under the action of the cam 193 and the spring 194 is caused to oscillate on the stud 191. Thus, in this case the projection 188 cannot engage the pawl 186 and raise same. The shaft 172 will thus remain in starting position, allowing the main shaft to rotate, until the key depressed be released. When this happens, the catch lever 196 will return to its normal position, allowing the projection 188 to catch the pawl 186 and move same together with arm 184 and shaft 172 to stop position with resulting stopping of the machine due to the fact that the releasing arm 165 is brought into engagement with the abutment 166 of the clutch dog 163 and releases same.

On using the machine for an addition or subtraction the indexing mechanism has to be restored to its starting position at the right of the machine after each revolution of the main shaft. This restoring is also effected under the control of the shift lever 16 by the aid of the following means.

The toothed wheel 117 on the motor shaft from which the power for driving the main shaft is derived and which, to this end, is in constant mesh with the toothed wheel 118 on the rigid shaft 119, is also in constant mesh with a toothed wheel 210, Fig. 3, loosely mounted on a stud 211, Fig. 3, fastened to the left hand side member of the machine frame. Said toothed wheel 210 is further in mesh with a toothed wheel 213, loosely mounted on a shaft 214 which is in its turn rotatably mounted. Riveted to the toothed wheel 213 is a clutch disc 215 concentric with the toothed wheel. Said clutch disc may be coupled to the shaft 214 by means of a clutch dog 216 pivotally mounted on a drum 217 keyed to the shaft 214. A spring 218 acts on the clutch dog and tends to swing the same into engagement with the notches of the clutch disc 215. The clutch dog 216 carries on the opposite side of its pivot 219 an arm having an outwardly projecting tooth 220 so positioned and arranged that it must engage an aperture 221 in the circumferential wall of the clutch drum 217 in order to allow the dog to engage the clutch disc 215. As long as the tooth 220 is prevented from entering the aperture 221, the clutch dog is maintained out of engagement with the clutch disc, so that no movement can be transferred from the motor to the shaft 214. The operation of the tooth 220 is controlled by means of two levers 222 and 223 both of which are loosely mounted on a stud 224 fastened to the left hand side member of the machine frame outside the drum. Each lever is provided with an inwardly projecting tooth 225 adapted to enter the aperture 221 to such an extent as to extend into the path of the tooth 220 of the clutch dog.

The lever 222 is controlled from the shift lever 16 of the key board. To this end the lever 222 is connected by means of a depending link 226, a bell crank lever 227 mounted near the base plate of the machine frame, and a longitudinally extending link 228 to the arm 207 above referred to which extends across the foremost, lower part of the key board frame. It has already been described how this arm 207 is connected to the shift lever 16. The left hand end of the arm 207 is pivoted to the base plate 1 at 230 and is connected at its middle point to the link 228 by means of the pivot 231. The aperture of the arm 207 adapted to receive the depending arm of the shift lever is so designed as to cause the arm 207 to be operated on shifting the lever 16. When the shift lever is in its upper (that is to say, addition or subtraction) position, the arm 207 is in its forward position, maintaining the bell crank lever 227 in its forward position, as shown by dotted lines in Fig. 3. The link 226 is now held depressed and keeps lever 222 lifted out of engagement with the aperture 221, as also shown by dotted lines in Fig. 3. With the shift lever in its lower position (that is to say, multiplication or division) the arm 207 is in its rear position, maintaining the bell crank lever 227, the link 226 and the lever 222 in their position shown by full lines in Fig. 3. In this position the tooth 225 of lever 222 is in engagement with the aperture 221 so as to prevent rotation of the clutch drum 217, thereby also preventing the shaft 214 from rotation.

The tooth 225 of lever 223 is normally in engagement with the aperture 221 under the influence of a spring 231 but is released therefrom at the conclusion of each revolution of the main shaft. The means for effecting this operation includes a pin 232 on the toothed wheel 121 keyed to the shaft 113 and a cam lever 234 mounted at 233. The cam 235 of said lever is actuated by the pin 232 once at each revolution of shaft 113. The free end of the cam lever is shaped as a fork 236 engaged by a pin 237 carried by the lever 223. As the cam 235 is raised by the pin 232, the pin 237 will be raised sufficiently to release the tooth 225 of the lever 223 from the aperture 221.

It is thus seen that a coupling of the shaft 214 and the clutch drum to the toothed wheel 213 can only be effected when the teeth 225 of both levers 222 and 223 are out of engagement with the aperture 221 of the clutch drum. This will happen only during the performance of an addition or subtraction. In such case the lever 222 is constantly held out of engagement, whereas the lever 223 is disengaged once at each revolution of the main shaft, as just described. Now, the clutch dog is allowed to enter the aperture 221 and couple the shaft 214 to the clutch disk 215, thereby causing the shaft 214 to be rotated one revolution at each revolution of the main shaft, whereupon the tooth 225 of the lever 223 by again engaging the aperture 221 stops the clutch drum 217 and its shaft 214. The rotation of the shaft 214 takes place immediately after the rotation of the main shaft or, rather, the shaft 113.

The rotation of shaft 214 is utilized in effecting the restoration of the indexing register by the following means. Attached to the shaft 214 is a cam disc 240, Fig. 18, engaged by a roller 241 carried at the upper end of a lever 242 mounted to rock on a pivot intermediate between its ends. The lower end of the lever 242 is shaped as a toothed segment 243 in constant mesh with a toothed wheel 244 mounted on a stud 245 fastened to the right hand side member of the machine frame. Also mounted on this stud is a rope drum 246, rigidly attached to the toothed wheel 244, see Fig. 19.

Attached to the rope drum is a rope 247 extending along the right hand side member 3 of the machine frame to or around a loose pulley 248 mounted adjacent the indexing mechanism, thence across the machine through an eye 249 adjacent the right hand end of the frame 23 of the indexing mechanism and along said mechanism to a tension spring 250 to the right hand end of which the rope is attached. Adjacent said spring the rope carries a collar 251 acting as a catch dog for the eye 249.

Figures 19, 21:
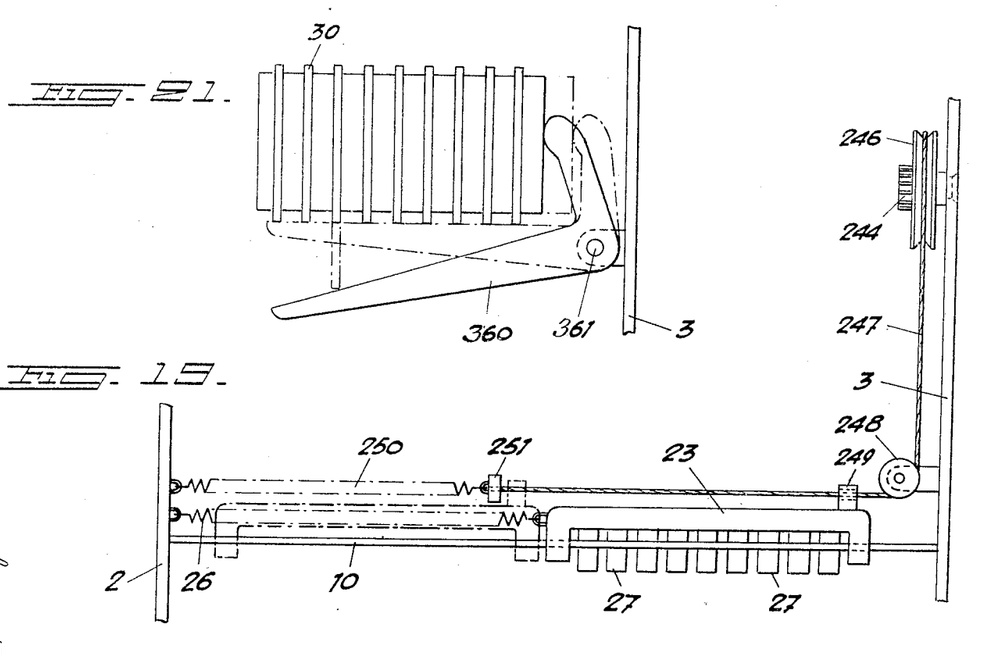
Fig. 19 is a plan view of other details of said restoring device.
Fig. 21 shows means for restoring to normal the individual elements of the indexing mechanism on the resetting thereof to starting position.

Normally the rope is held in the position shown in Fig. 19. In this position the catch dog 251 is in its left-hand position, the eye 249 being immediately adjacent thereto when the indexing mechanism is in its extreme left hand position. Each time the shaft 214 in performing an addition or subtraction rotates one revolution in the way above described, the upper end of the arm 242 is swung gradually outwards by the action of the cam 240 while rotating the toothed wheel 244 so as to wind the rope up on the drum. The catch dog 251 now moves the eye with it, restoring the indexing mechanism to its starting position at the right of the machine, irrespective of the position of the indexing mechanism. As soon as the action of the cam disc ceases at the end of the revolution, the spring 250 retracts the rope, thereby returning the drum and the arm 242 to their starting positions shown in Figs. 18 and 19.

Simultaneously with the returning of the indexing mechanism to its starting position the racks of the indexing mechanism are positively returned to normal by means of a bell crank lever 360, Fig. 21. This lever is pivotally mounted at 361 to the right hand side member 3 of the machine frame. An upstanding arm of the lever extends into the path of the indexing mechanism, so that it will be forced towards the wall 3 by the returning mechanism. The other arm of the bell crank lever 360 extends horizontally in the transverse direction of the machine along the under side of the indexing mechanism when the latter is in its extreme right hand or normal position. With the mechanism displaced to the left from said position the said other arm is swung down so that its upper edge forms an inclined plane along which the depressed racks 30 of the returning mechanism may slide. As the indexing mechanism in its return stroke approaches its normal position and operates the bell crank lever 360 the lower arm thereof will be raised, thereby restoring all of the racks 30 depressed.

Figures 16, 17, 18, 20:
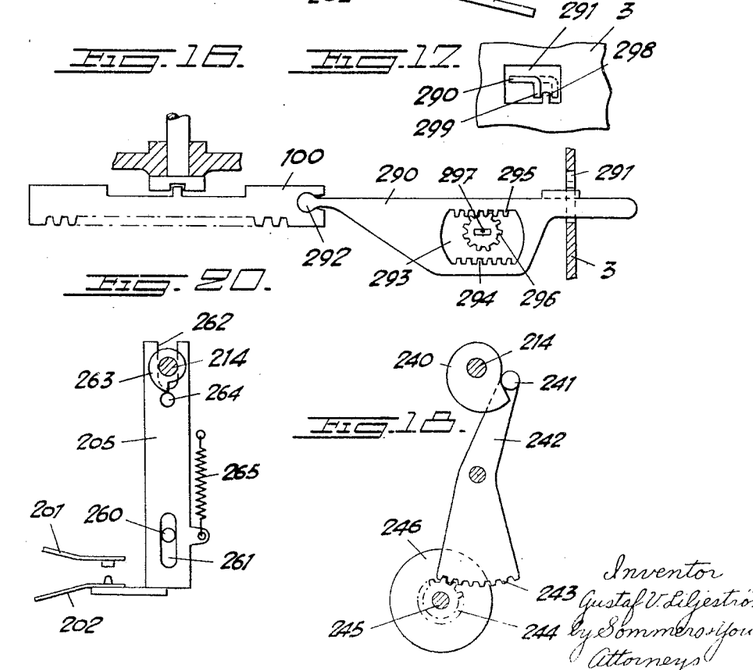
Fig. 16 is a plan view of the driving device of the quotient register of the machine.
Fig. 17 is an end view of said driving device, as seen from the right hand side of Fig. 16.
Fig. 18 is a side elevation of certain details of a device for automatically restoring the indexing mechanism to its normal position.
Fig. 20 shows means for actuating the interrupter of the driving motor under the control of the restoring device.

While in operation for controlling the automatic restoration of the indexing mechanism the shaft 214 also controls the interrupter for the motor circuit. This is effected by means of the stop 205 cooperating with the lower contact spring 202, Fig. 20, as already described. The stop 205 consists of a vertically movable slide guided, in part, by a stationary pin 260 engaging a slot 261 in the lower portion of the slide and, in part, by the shaft 214 extending through a slot at the upper end of the slide, see Fig. 20. A pin 264 secured to the slide 205 below the slot 262 is perpetually held in contact with a cam disc 263 on the shaft 214 by the action of a spring 265. As long as shaft 214 stands still, the interrupter is only controlled from shaft 172. Thus, when shaft 214 stands still and shaft 172 is in its normal position, then the slide is in a depressed position in which the contact is open, as shown in Figs. 11 and 20. When the machine is used for performing a multiplication or division while shaft 214 is prevented from rotation due to the stop lever 222 being in its operative position, the interrupter is thus controlled merely from shaft 172. On rotation of shaft 172 in clockwise direction by depression of either of the starting keys 12, 13, the interrupter is thus closed, to be again opened when the shaft 172 upon the completion of a revolution of the main shaft 80 is returned to its normal position.

In addition or subtraction, the tooth 225 of lever 222 is constantly out of engagement with the aperture 221 of the clutch drum 217 and the arm 234 will be raised by the pin 232 immediately prior to the main shaft reaching its normal position. The clutch 215—216 is now operated.

At this moment, immediately after the opening of its circuit, the motor has still a sufficient speed to turn the shaft 214 to such an extent as to cause the top of the cam 263 to slide off the pin 264, allowing the spring 265 to raise the stop member 205 and cause it to bring the interrupter spring 202 into contact with spring 201, thereby again closing the circuit. The shaft 214, but not the main shaft, is now rotated one revolution until, at the completion of this revolution, the cam 263 depresses the stop member 205 to such an extent as to move spring 202 out of contact with spring 201, thereby again opening the circuit.

In multiplication or division, in which case the indexing mechanism remains in calculating position as long as the respective starting key is held depressed, a more smooth and reliable operation of the counting spindles will be obtained, if the spindles remain in their displaced positions as long as the indexing mechanism remains in the counting position. To obtain this effect the following means are provided.

Loosely mounted on the aforesaid bearing post 190 by means of two pins, viz. one upper 271 and one lower 272 is a plate 270. The pins engage arc-shaped slots 273 and 274, respectively, in a side member of the bearing post. A tension spring 275 acts to move the upper end of plate 270 rearwardly. A link 276 connects a pin 277 on the plate 270 to the pin 197 on the starting link 156. By the combined action of the spring 275 and the starting link the pivot pins 271 and 272 of plate 270 are normally kept in contact with the rear ends of the respective guide slots 273 and 274. Provided near the bottom of the bearing post 190 is a pawl 278 mounted on the pivot 279 which is adapted to engage the lower end of plate 270. The operation of said pawl is controlled by the shift link 208. The upwardly projecting end (i. e. the stop 209) of this link is formed at about half of its height with a shoulder on which the lower edge of the pawl rests. When the stop 209 is in its fore position, that is to say, when the shift lever 16 is set for addition or subtraction, as shown in Fig. 4, said shoulder is situated below a forwardly extending projection 280 of pawl 278 which is thereby held depressed out of the path of the lower end of plate 270. As any of the starting keys 12 or 13 is depressed and the starting link 156 is pulled forwardly, it will move link 276 with it. The pivot pin 277 when thus moving forwardly (to the left in Fig. 4) causes the plate 270 to swing about its upper pivot 271 which is held stationary in its rear position by the tension of spring 275 while the lower pivot pin 272 moves forwardly (to the left in the drawing) from the rear end to the fore end of slot 274.

On shifting the lever 16 to its lower position (for multiplication or division) the link 208 is displaced rearwardly, as already described, until the stop member 209 reaches the position indicated at 209'. During this movement the shoulder of member 209 slides along the under side of the pawl 278 and raises it so that its rear end comes into the path of the lower end of plate 270, as shown in Fig. 15. The pin 272 is thus locked in its position at the rear end of slot 274. If now the starting key 12 or 13 be depressed, the link 276 is pulled forwardly, causing plate 270 to swing about its lower pin 272 thus locked. The upper end of plate 270 is now tilted forwardly (to the left in the drawing) against the action of spring 275, the pin 271 sliding in the slot 273 from the rear to the fore end thereof. Said two extreme positions of pin 271 are indicated in Fig. 1 at 271 and 271', respectively. In the said last mentioned position the pin 271 is within reach of an arm 281 of the pawl 89 mounted on the slide 84 which engages the pin 82 of the rear arm 81 of the bridge 78. When the pin 271 in addition and subtraction is in its extreme rear position, as indicated at 271 in Fig. 1, it is out of reach of the arm 281. The arm 281 may thus move freely up and down with the slide 84 while allowing the pawl 89 to keep the pin 82 at the bottom of the slot 83, as in Fig. 1. The pin 82 thus moving with the slide causes the bridge to rock up and down once for each revolution of the main shaft, thereby dropping the counting spindles as in Fig. 1 and again raising them once each revolution, as in Fig. 1a.

In multiplication and division, the pin 271 while moving in the way described to its extreme fore position, as indicated in dotted lines at 271' in Fig. 1, depresses the arm 281, causing the cam shaped lower end of the pawl 89 to release the pin 82, so that it cannot be operated by the reciprocating slide. Thus, the bridge 78 moves to its depressed state, as shown in Fig. 1, in its turn allowing the counting spindles to drop to their lower displaced positions.

As hereinbefore stated the totalizer and the quotient register of the machine are mounted in a carriage reciprocable across the machine frame. In the drawing (Fig. 1) said carriage 71 is shown in section, the totalizer being only indicated by a circle 69 representing a totalizer wheel or rather an associated toothed wheel adapted to engage any of the toothed wheels 68 of the counting spindles as the beam 63 is raised. The quotient register serving to register the number of revolutions of the main shaft is not shown in the drawing. It is mounted at the right of the carriage and controlled by the uppermost proportion rack 100 corresponding to the digit 1. To this end the right hand end of said proportion rack is linked to a control bar 290 (Fig. 16) extending through an aperture 291 in the right hand side member 3 of the frame. The connection between the rack 100 and the control bar consists of a universal joint 292 allowing the bar to swing both up and down and to the sides within the range determined by the aperture 291. The control bar 290 consists of a plate lying in a horizontal or nearly horizontal plane which is formed with a slot 293 the fore and rear parallel edges of which are each provided with a row of teeth 294 and 295, respectively, which on the swinging of the plate are alternately brought into mesh with a pinion 296 on an upstanding spindle 297. The aperture 291 in the frame side member 3 has on its lower edge a tooth 298 and the plate 290 has a depending finger 299 (Fig. 17) which by horizontal and vertical oscillation of the plate 290 may be brought to a position in front of or behind the tooth 298 according as it is desired to keep the fore or rear row of teeth 294 or 295 in mesh with the pinion 296. The shaft 297 is only rotatably but not slidably mounted in the frame of the machine and engages at its upper end with a sleeve shaped member 300 in a way similar to that in which the lower members 61 of the counting spindles engage the sleeves 62. The sleeve 300 carries at its upper end a mitre wheel 301 in constant mesh with a mitre wheel 302 loosely mounted on a stud 303 carried by a post on the beam 63, said mitre wheel being rigidly connected to a spur wheel 304 adapted to mesh with a toothed wheel of the quotient register subsequent to the raising of the beam 63 in the same way as already described in connection with the description of the counting spindles. Since the movement of the spindle 297 is exclusively derived from the uppermost proportion rack 100, the toothed wheel of the quotient register is only rotated one tooth upon each revolution of the main shaft.

In connection with the totalizer tens transfer mechanisms of various kinds may be provided.

The stepping of the totalizer carriage under the control of the tabulator keys 14, 15 is effected by means of the following mechanism.

The supporting rods 310 and 311 of keys 14, 15 operate each on the horizontal arm of an individual T-shaped rocking lever 312, Fig. 2, the depending arm of which is connected by a horizontal link 313 and a bell crank lever 315 mounted on a vertical stud 314 to the lower end of a vertical lever 316, Fig. 8. Said lever is mounted at about its middle point on a stud 317. The upper end of the lever 316 is fork-shaped and engaged by a pin 318 fastened to the right hand end of a slide 319 mounted to the rear surface of the cross bar 8. The slide 319 comprises a plate having two longitudinally extending slots 320 by means of which the plate slides on a pair of guide pins 321 fastened to the cross bar 8.

The stud 317 on which the vertical lever 316 is mounted is carried by a bracket 322 fastened to the side wall 3 of the machine frame. Fastened to the same bracket on the same level as the stud 317 but nearer to the side wall 3 is another stud 323 carrying two restoring dogs 324 and 325 for the lever 316. Said restoring dogs bear against the inwardly facing edge of the lever 316, viz. dog 324 engaging the lever above and dog 325 below its pivot 317. Each dog is carried by a lever having an arm 326 or 327 facing the wall 3 and bearing thereagainst in the normal (i. e. vertical) position of the lever 316. The lever of dog 324 carries, in addition, below the stud 323 a downwardly and inwardly inclined arm 328, the lever of dog 325 carrying an upwardly and inwardly inclined arm 329 above the stud 323. Inserted between the ends of said arms is a tension spring 330.

The slide 319 carries two pawls 331 and 332, the former adapted for moving the totalizer carriage to the right and the latter for moving the carriage to the left. Said pawls act on a common ratchet gear 334 mounted at 333 to the middle of the cross beam 8 which is provided with a number, say six, ratchet pins 335 parallel to the pivot pin 333 of the gear. The pawls are oppositely arranged with respect to the ratchet pins so as to rotate the gear 334 in opposite directions. The ratchet gear is also formed with teeth on its circumference so as to form a toothed wheel in mesh with a toothed wheel 336 for driving a transmission element of the carriage not shown.

As long as the tabulating keys 14, 15 are not operated the link 313 is in an intermediate position in which position the longitudinally extending arm of bell crank lever 315 extends parallel to the side wall 3 of the machine frame, as shown in Fig. 2, and the link 316 is in its vertical position, as shown in Fig. 8. The slide 319 now is in an intermediate position in which the pawls 331 and 332 bear with their ends against two adjacent pins 335 of gear 334. On depression of key 14 the lever 312 is rocked in a counterclockwise direction, as viewed from the right hand side of the machine, the link 313 is displaced rearwardly and the longitudinally extending arm of bell crank lever 315 is moved to the left, that is to say, away from the side wall 3. The movement of lever 315 turns the lever 316 in a clockwise direction in Fig. 8, thereby displacing slide 319 to the right. The pawl 331 carries the pin 335 in contact therewith with it turning the ratchet gear 334 in a counter clockwise direction in Fig. 8 to an extent determined by the slots 320, that is to say, in the example shown, 60 degrees. The pawl 332 being at the same time moved to the right does not prevent the rotation of the gear. As the key is released, the vertical lever 316 is restored to its intermediate position by the spring 330 and restores in its turn, on the one hand the link 313 and the key 14 and on the other hand the slide 319 to their normal positions. On the return of the slide the pawl 331 is slid along the under side of the succeeding pin 335 and is thereby swung downwards. This is due to the fact that in the normal position of the pawls depending arms 341 and 342, respectively, of the pawls abut against vertical shoulders of the slide which prevent raising of the pawls beyond their normal position but allow downward movement of the pawls, as will clearly appear from Fig. 8.

On depression of the key 15 the various elements under consideration will be operated in the reversed order to that above described. In this case the gear 334 is turned 60 degrees in a clockwise direction upon each operation.

As I have hereinbefore described the operations of the various main parts of the machine it is deemed unnecessary to describe the operation of the machine as a whole with the exception of some explanations.

As to the transfer of the items to the totalizer the following is to be noted.

The direction of rotation of the main shaft 80 determines the direction of rotation of the counting spindles at the time when the numeral wheels of the totalizer are driven. This will appear from Fig. 22, the cam slot 108 showing that a rotation of the main shaft 80 in the direction of the arrow S will move the arm 106 in the direction S', moving the proportion racks to the position shown in Fig. 6. This operation has taken place during the slope A of the curved slot. The proportion racks remain in this position under the control of the section B of the slot 108. During this standstill the bridge 78 descends in the way already described and the guide rods 73 with the associated lower members 61 of the counting spindles are displaced to the positions determined by the indexing mechanism or selector. If, for instance, the key representing the digit 8 has been depressed, then one of the racks 30 has been moved down till it strikes to stopping end 22' (Fig. 1) and the spindle is displaced accordingly, while the remaining spindles descend into engagement with the stationary rack 101 corresponding to the digit 0 which cannot turn the spindles. In the meantime the beam 63 together with the sleeves 62 and the toothed wheels 68 are raised to bring the latter into mesh with the numeral wheels 69 on the totalizer carriage 71 owing to the fact that the cam 99 on the main shaft has rotated the forked arms 92 in a clockwise direction and raised the slides 90. During this operation the bridge 95 interconnecting the arms 94 formed integrally with the arms 92 engages the braking pawls 96, causing them to release the totalizer wheels 69 so that they may be easily rotated by the counting spindles, which will thus be subjected to a very slight load only. This in its turn provides very easy running of the machine. During that portion of the rotation of the drum 109 in which the section C of the cam slot 108 is in operation, the arm 106 is shifted to its opposite extreme position, moving the proportioning racks to the position shown in Fig. 7, the amount of movement of each individual rack depending on its position with relation to the other racks. Thus, the eighth rack as reckoned from above is moved eight steps and the counting spindle controlled thereby is turned through a corresponding angle, in its turn imparting over the respective intermediate wheel 68 a corresponding rotation to a numeral wheel of the totalizer. As thereafter the straight section D of the cam slot 108 comes into operation the proportion racks are held stationary. In the meantime the beam 63 descends, bringing the intermediate wheels 68 out of mesh with the numeral wheels 69, the lower member 61 of the counting spindles being simultaneously raised to their normal position. Then the cam slot 108 returns to its normal position, restoring the proportion racks 100 to the position shown in Fig. 5. Let it now be assumed that the main shaft rotates in the reverse direction, that is to say, as indicated by the arrow T in Fig. 22, then the arm 106 would first move to the position shown in Fig. 7, before the spindles and the associated intermediate wheels reached their operative or counting position. It is thus seen that also a reversal of the direction of rotation of the spindles would be opposite to that just stated.

What I claim is:

1. In a machine of the class described, the combination of an indexing mechanism movable in the transverse direction of the machine, a keyboard including ten numeral keys for setting items up in the indexing mechanism, a carriage movable in the transverse direction of the machine, totalizing wheels and associated gear wheels thereon, a row of approximately vertical counting spindles extending in the transverse direction of the machine below the path of said carriage and behind the indexing mechanism, a pile of racks arranged behind said row of counting spindles including a stationary rack and a set of slidable proportion racks thereon, extending in a direction at right angles to the spindles, gear wheels on the spindles to cooperate with said proportion racks, means to displace the spindles axially to bring the gears thereof into mesh with the desired racks, means carried by the indexing mechanism to predetermine said displacement of the spindles in accordance with the setting of the indexing mechanism, a main shaft, means operable by the main shaft to bring the spindles thus displaced into operative connection with the gear wheels of the totalizer carriage and a proportion lever adapted to oscillate under the control of the main shaft to displace the proportion racks.

2. A machine according to claim 1, wherein said indexing mechanism comprises a carriage shiftable transversely of the machine, an escapement mechanism for controlling stepwise movement of said carriage in response to depression of said keys, a group of indicating numeral wheels mounted in said carriage, spring-urged racks slidably mounted in said carriage in engagement with said numeral wheels and adjustable axially of said counting spindles by said keys in sequence, the means for predetermining the displacement of the counting spindles comprising shoulders formed on the edges of the racks facing the counting spindles, said shoulders serving as stops for said spindles, said means for axially displacing said spindles comprising springs.

GUSTAF VILHELM LILJESTRÖM.

REFERENCES CITED

The following references are of record in the file of this patent:

UNITED STATES PATENTS

| Number | Name | Date |
| --- | --- | --- |
| 1,011,617 | Hammann | Dec. 12, 1911 |
| 1,330,893 | Morse | Feb. 17, 1920 |
| 1,662,526 | Luttropp | Mar. 13, 1928 |
| 1,707,303 | Greve | Apr. 2, 1929 |
| 1,806,070 | Luttropp | May 19, 1931 |
| 1,823,552 | Luttropp | Sept. 15, 1931 |
| 1,896,182 | Luttropp | Feb. 7, 1933 |
| 1,953,557 | Greve | Apr. 3, 1934 |
| 1,958,970 | Luttropp | May 15, 1934 |
| 1,983,625 | Luttropp | Dec. 11, 1934 |
| 2,062,963 | Benninger | Dec. 1, 1936 |
| 2,068,899 | Anneren et al. | Jan. 26, 1937 |
| 2,088,397 | Bilde | July 27, 1937 |
| 2,398,286 | Carlstrom et al. | Apr. 9, 1946 |